(12) United States Patent
Richter

(10) Patent No.: US 11,963,837 B2
(45) Date of Patent: Apr. 23, 2024

(54) CHEEK RETRACTOR

(71) Applicant: Tesoro IP Holding, LLC, Greeley, CO (US)

(72) Inventor: David D. Richter, Greeley, CO (US)

(73) Assignee: Tesoro IP Holding, LLC, Greeley, CO (US)

( * ) Notice: Subject to any disclaimer, the term of this patent is extended or adjusted under 35 U.S.C. 154(b) by 103 days.

(21) Appl. No.: 17/722,675

(22) Filed: Apr. 18, 2022

(65) Prior Publication Data

US 2023/0329848 A1 Oct. 19, 2023

(51) Int. Cl.
*A61C 17/10* (2006.01)
*A61C 17/08* (2006.01)

(52) U.S. Cl.
CPC .............. *A61C 17/10* (2019.05); *A61C 17/08* (2019.05)

(58) Field of Classification Search
CPC .. A61C 5/90; A61C 17/10; A61B 1/24; A61N 2005/1094
See application file for complete search history.

(56) References Cited

U.S. PATENT DOCUMENTS

| | | | | |
|---|---|---|---|---|
| 3,916,880 A * | 11/1975 | Schroer | ................. | A61C 17/10 600/242 |
| 5,037,298 A * | 8/1991 | Hickham | ................. | A61C 5/90 433/93 |
| D496,995 S * | 10/2004 | Dorfman | ................. | A61B 1/24 D24/135 |
| 6,923,761 B1 * | 8/2005 | Dorfman | ................. | A61B 1/24 433/140 |
| 7,785,105 B2 * | 8/2010 | Anderson | ............. | A61C 17/08 433/91 |
| 7,988,626 B2 | 8/2011 | Horvath | | |
| 9,901,332 B2 * | 2/2018 | Jessop | ...................... | A61B 1/32 |
| 10,779,718 B2 | 9/2020 | Meyer et al. | | |
| 2006/0069316 A1 * | 3/2006 | Dorfman | ................. | A61C 5/90 600/237 |
| 2018/0228359 A1 | 8/2018 | Meyer et al. | | |
| 2020/0375696 A1 * | 12/2020 | Jessop | ...................... | A61B 1/24 |

FOREIGN PATENT DOCUMENTS

| AU | 2019200043 B2 | 1/2019 |
|---|---|---|
| WO | WO 2020/173964 A1 | 9/2020 |

OTHER PUBLICATIONS

Great Lakes Orthodontics. Great Lakes NOLA Dry Field System. Brochure, originally downloaded Dec. 23, 2021, 2 pages.

* cited by examiner

*Primary Examiner* — Ralph A Lewis
(74) *Attorney, Agent, or Firm* — Craig R. Miles; CR MILES P.C.

(57) ABSTRACT

Generally, a dental appliance to engage the lip and cheeks of a user to expose the teeth. Specifically, a first integrated construct including a bridge disposed between the first lip holder and a second lip holder, and a second integrated construct including a tongue receiver defining an open-ended chamber and a tongue receiver support including a pair of arcuate support members each having an arcuate portion joining a support member first arm adapted to correspondingly releasably couple to the first lip holder and the second lip holder and a support member second arm correspondingly coupled to the tongue receiver.

23 Claims, 10 Drawing Sheets

CHEEK RETRACTOR

I. FIELD OF THE INVENTION

Generally, a dental appliance to engage the lip and cheeks of a user to expose the teeth. Specifically, a first integrated construct including a bridge disposed between the first lip holder and a second lip holder, and a second integrated construct including a tongue receiver defining an open-ended chamber and a tongue receiver support including a pair of arcuate support members each having an arcuate portion joining a support member first arm adapted to correspondingly releasably couple to the first lip holder and the second lip holder and a support member second arm correspondingly coupled to the tongue receiver.

II. BACKGROUND OF THE INVENTION

Conventional cheek retractors may be assembled from a plurality of component parts. This can be difficult because assembly occurs in the mouth of a user. As one example, a conventional cheek retractor can include six parts which assemble or adjust to fit while in the mouth of a user including releasably connecting a first lip holder and a second lip holder respectively to a bridge first end and a bridge second end which maintains the first lip holder and the second lip holder in fixed spatial relation a distance apart. The first lip holder and the second lip holder engage the lips of the user to hold the cheeks away from the teeth of the user. While the first lip holder and the second lip holder engage the lips of the user to hold the cheeks away from the teeth a first vacuum tube can be connected to a first aspirator duct disposed proximate a tongue holder first side and a second vacuum tube can be connected to a second aspirator duct disposed proximate a tongue holder second side, and the tongue holder can then be disposed between and connected proximate the first lip holder and the second lip holder to hold the tongue of the user. The first vacuum tube and the second vacuum tube can be drawn outward of the mouth of the user and respectively secured proximate opposite bridge first and bridge second ends. The first and second vacuum tubes are then coupled to a tee coupler through which a vacuum is drawn to evacuate oral cavity secretions.

The multiplicity of components of certain conventional cheek retractors and the assembly in the mouth of the user can be uncomfortable for the user and time consuming for the service provider. Additionally, the multiplicity of components in the mouth of the user may limit access to the first, second or third molars of the user which may require removal of the conventional cheek retractor from the mouth of the user and treatment of molars in a separate procedure.

III. SUMMARY OF THE INVENTION

Accordingly, a prominent object of certain embodiments of the inventive dental appliance can be to provide a bridge disposed between the first lip holder and a second lip holder, and a tongue receiver defining an open-ended chamber, and a tongue receiver support including a pair of arcuate support members each having an arcuate portion joining a support member first arm adapted to correspondingly releasably couple to the first lip holder and the second lip holder and a support member second arm correspondingly coupled to the tongue receiver, wherein the corresponding arcuate portion of the pair of arcuate supports can be correspondingly disposed behind the rearmost molar on the left side of the maxillary dental arch and the right side of maxillary dental arch with the corresponding support member first arm extending along the left buccal mucosa and the right buccal mucosa toward the mouth opening of the user to correspondingly draw the left buccal mucosa and the right buccal mucosa away from the teeth of both the maxillary dental arch and the mandibular dental arch to allow access to even the most rearward molars of the maxillary dental arch and the mandibular dental arch.

Another prominent object of certain embodiments of the inventive dental appliance can be to provide at least one of: a first integrated construct including a bridge disposed between the first lip holder and a second lip holder, and a second integrated construct including a tongue receiver defining an open-ended chamber and a tongue receiver support including a pair of arcuate support members each having an arcuate portion joining a support member first arm adapted to correspondingly releasably couple to the first lip holder and the second lip holder and a support member second arm correspondingly coupled to the tongue receiver.

Another prominent object of the invention can be to provide a method of making the inventive dental appliance including one or more of disposing a bridge between a first lip holder and a second lip holder, forming a tongue receiver as an open-ended chamber having interior surface configured to receive a tongue tip, and coupling a tongue receiver support to said tongue receiver, the tongue receiver support including a pair of arcuate support members each having an arcuate portion joining a first support member arm adapted to correspondingly couple to the first lip holder and the second lip holder and a second support member arm correspondingly coupled to the tongue receiver.

Another prominent object of the invention can be to provide a method of using the inventive dental appliance including one or more of engaging a first lip holder to a lip of a mouth of a user and engaging a second lip holder to the lip of the mouth of the user, engaging a tongue receiver with a tongue tip inside of the mouth of a user, coupling the tongue receiver to the first lip holder and the second lip holder with a tongue receiver support including a pair of arcuate support members each having an arcuate portion joining a first support arm to a second support arm, each the second support arm extending from the tongue receiver to the arcuate portion correspondingly disposed behind a left rearmost maxillary molar and right rearmost maxillary molar with the first support member arm correspondingly extending along a left buccal side and a right buccal side of a maxillary dental arch to correspondingly releasably couple to said first lip holder and said second lip holder.

Naturally, further objects of the invention are disclosed throughout other areas of the specification, drawings, photographs, and claims.

IV. BRIEF DESCRIPTION OF THE DRAWINGS

V. DETAILED DESCRIPTION OF THE INVENTION

Figure 1:
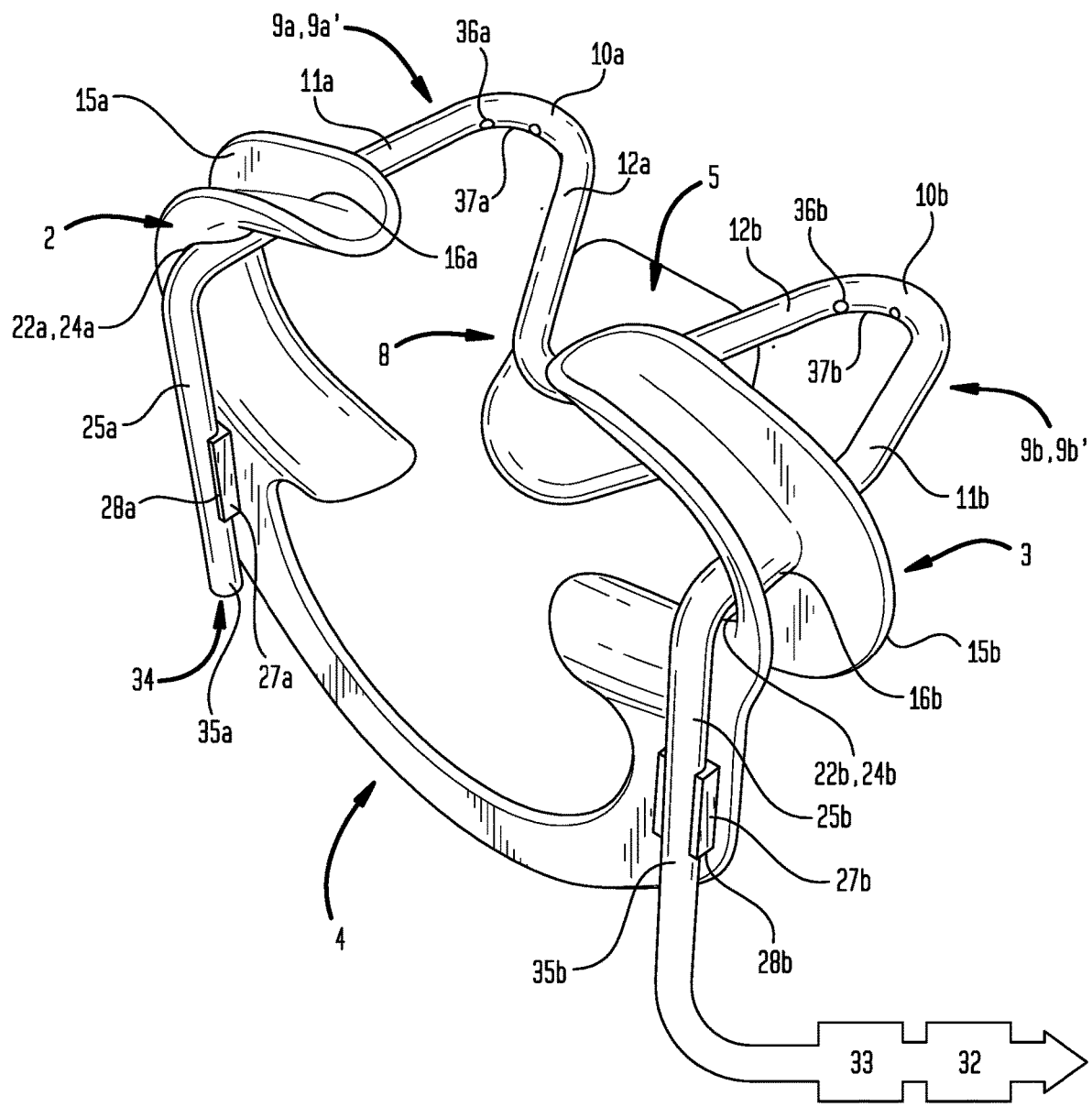
FIG. 1 is a front perspective view of a particular embodiment of the inventive cheek retractor.

Generally, referring to FIGS. 1 through 10 which illustrate embodiments of an inventive dental appliance (1), a method of making embodiments of the dental appliance (1) and methods of using the dental appliance (1). Embodiments of the dental appliance (1) include, or consist of, one or more of: a first lip holder (2) and a second lip holder (3), a bridge (4) disposed between the first lip holder (2) and the second lip holder (3), a tongue receiver (5) having a tongue receiver interior surface (6) defining an open-ended chamber (7), and a tongue receiver support (8) including a pair of arcuate support members (9a, 9b) each having an arcuate portion (10a, 10b) joining a support member first arm (11a, 11b) adapted to correspondingly couple to the first lip holder (2) and the second lip holder (3) and a support member second arm (12a, 12b) correspondingly coupled to the tongue receiver (5).

Now, with primary reference to FIGS. 1 through 10, the first lip holder (2) and the second lip holder (3) can be adapted or configured to fit into a mouth (13) of a user (14). The first lip holder (2) and the second lip holder (3) can each comprise an arcuate channel (15a, 15b) defining a lip engaging surface (16a, 16b) adapted to or configured to engage a lip (17) of the user (14); however, this is not intended to obviate embodiments which may have a different configuration of the first or second lip holder (2, 3) or the lip engaging surface (16a, 16b), other than an arcuate channel (15a, 15b).

Figure 2:
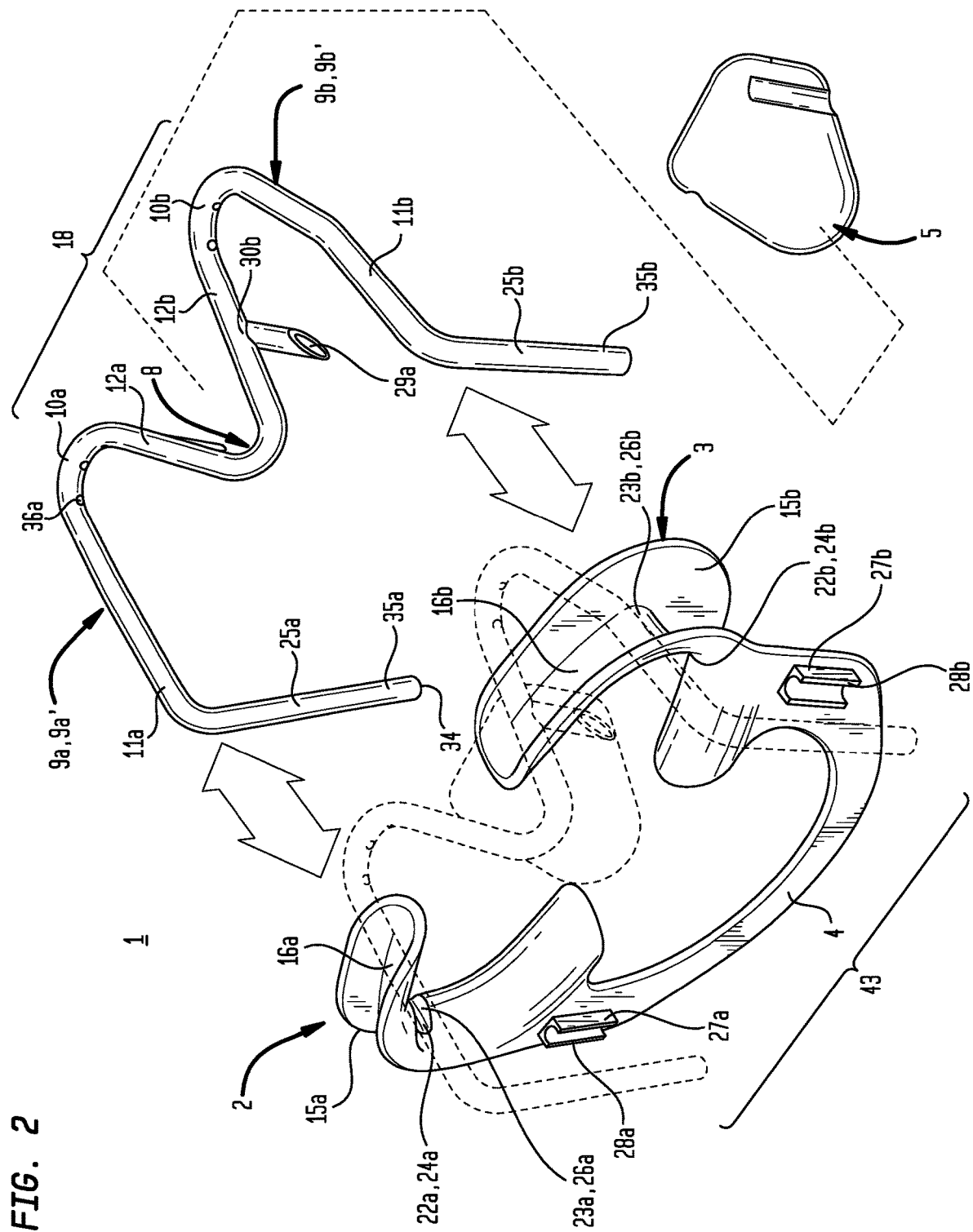
FIG. 2 is an exploded view of a particular embodiment of the inventive cheek retractor.
Figure 3:
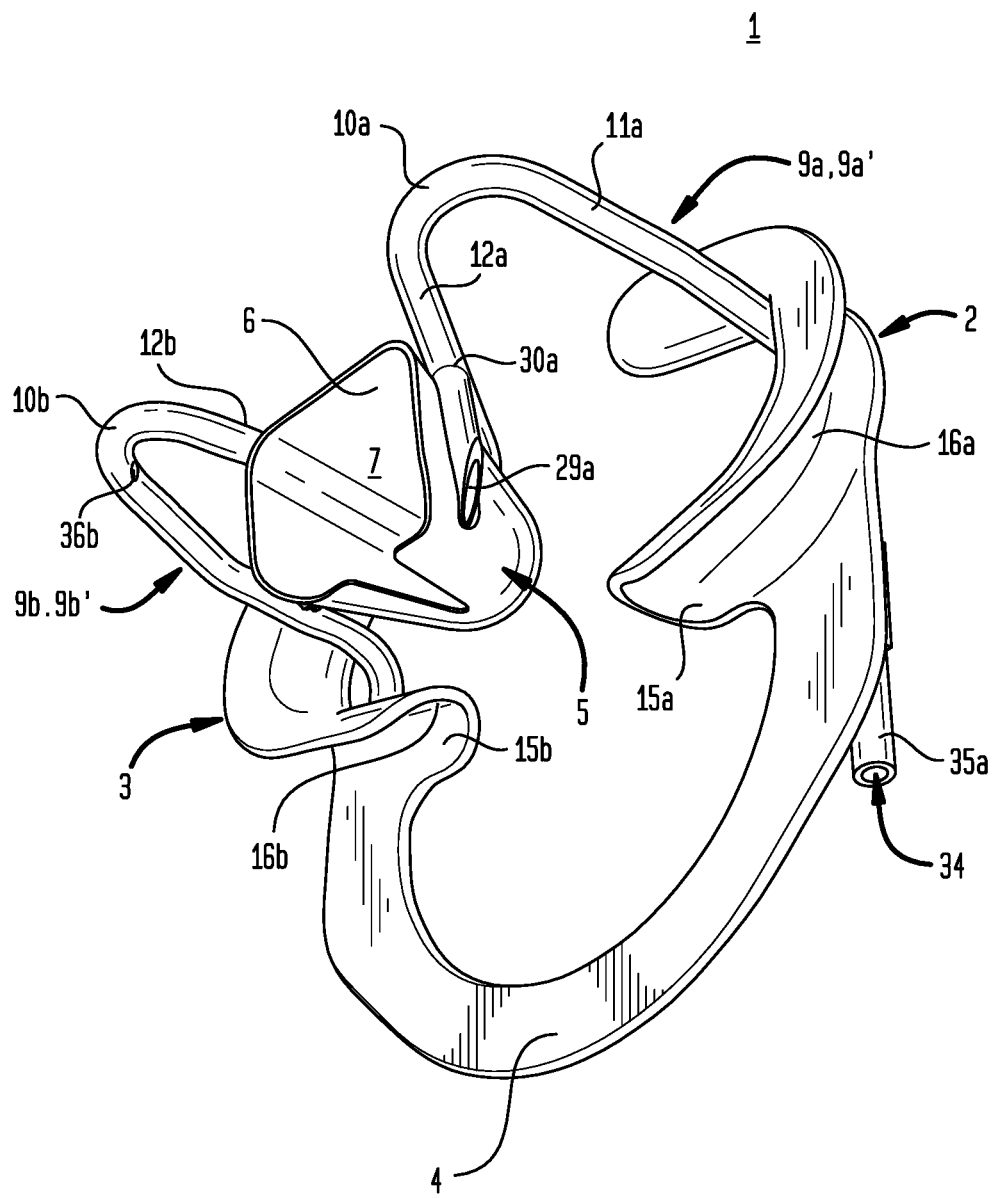
FIG. 3 is rear perspective view of a particular embodiment of the inventive cheek retractor.
Figure 4:
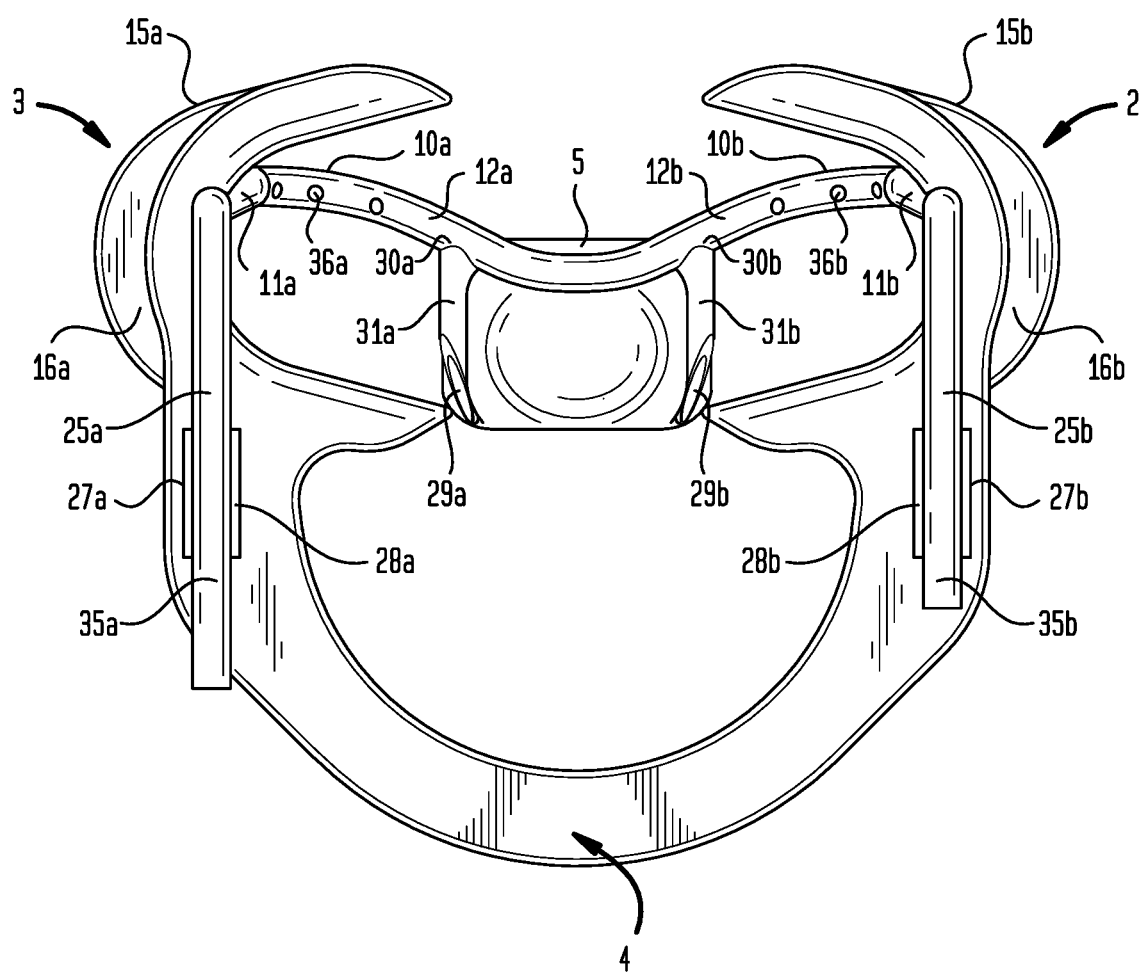
FIG. 4 is a front elevation view of a particular embodiment of the inventive cheek retractor.
Figure 5:
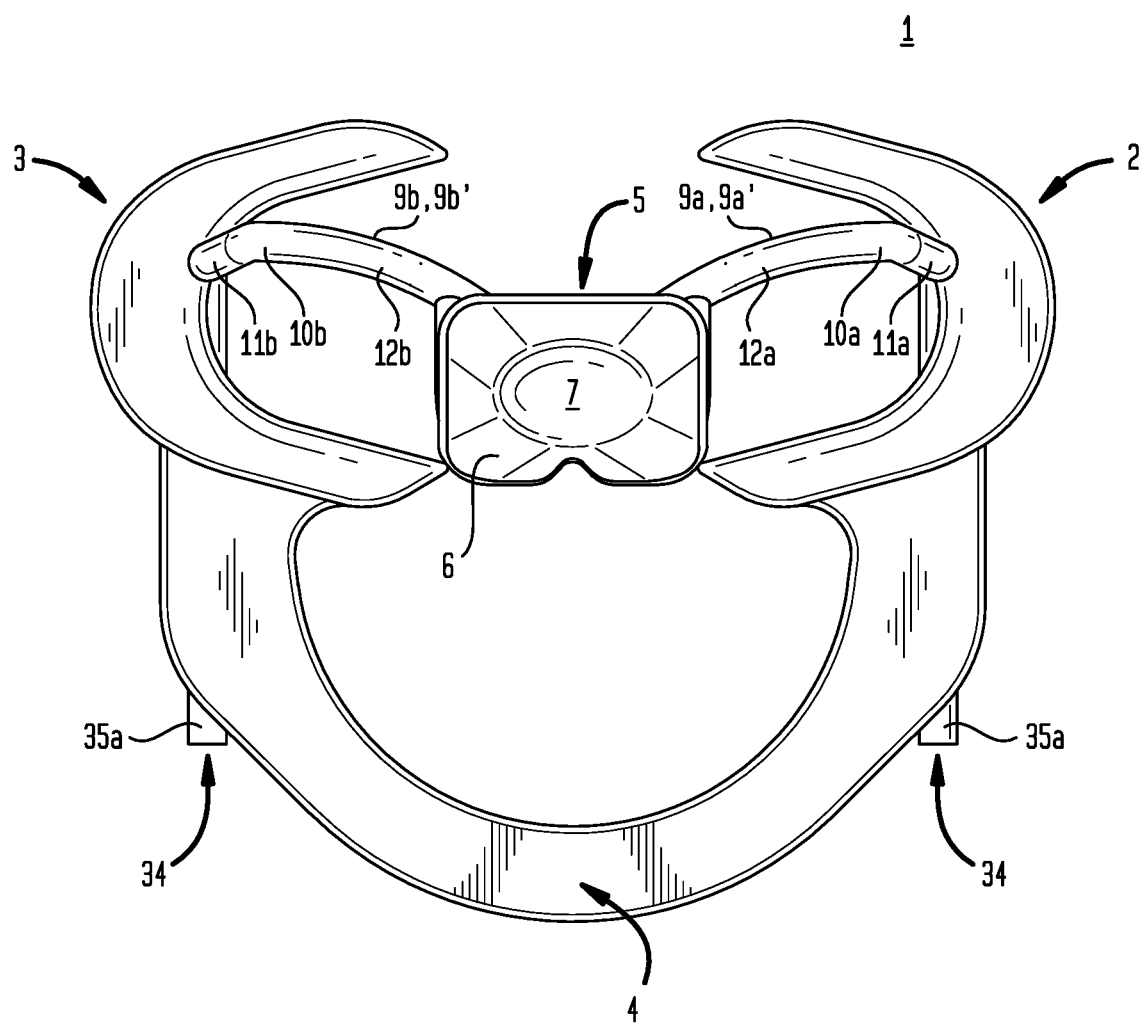
FIG. 5 is a rear elevation view of a particular embodiment of the inventive cheek retractor.
Figure 6:
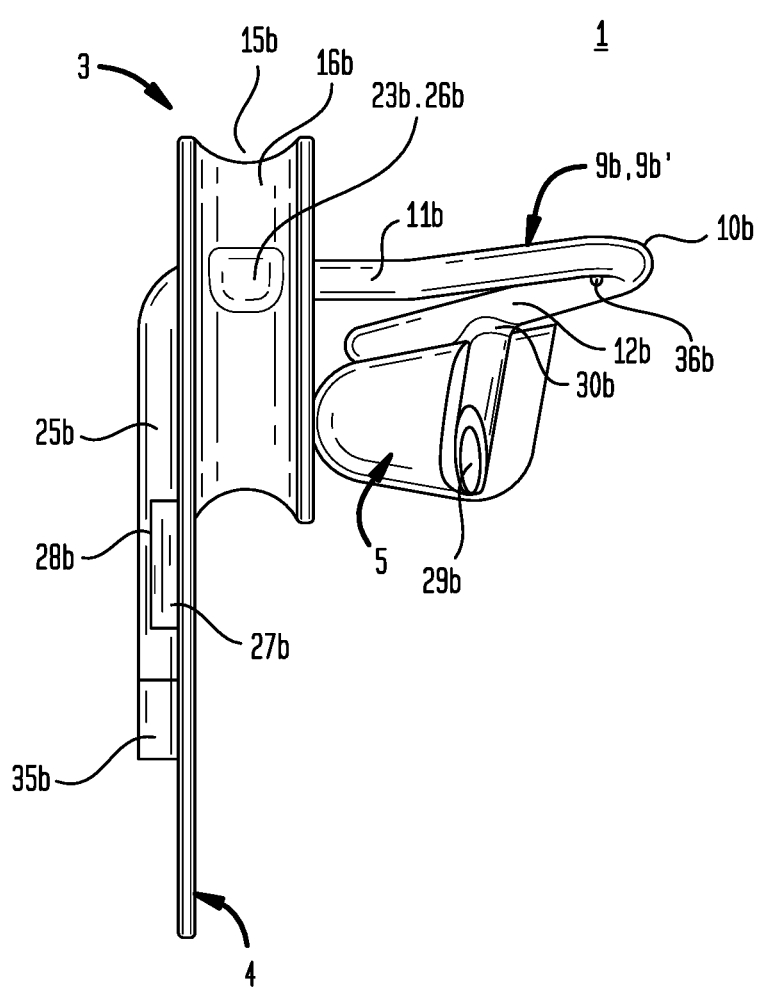
FIG. 6 is a first side elevation view of a particular embodiment of the inventive cheek retractor.
Figure 7:
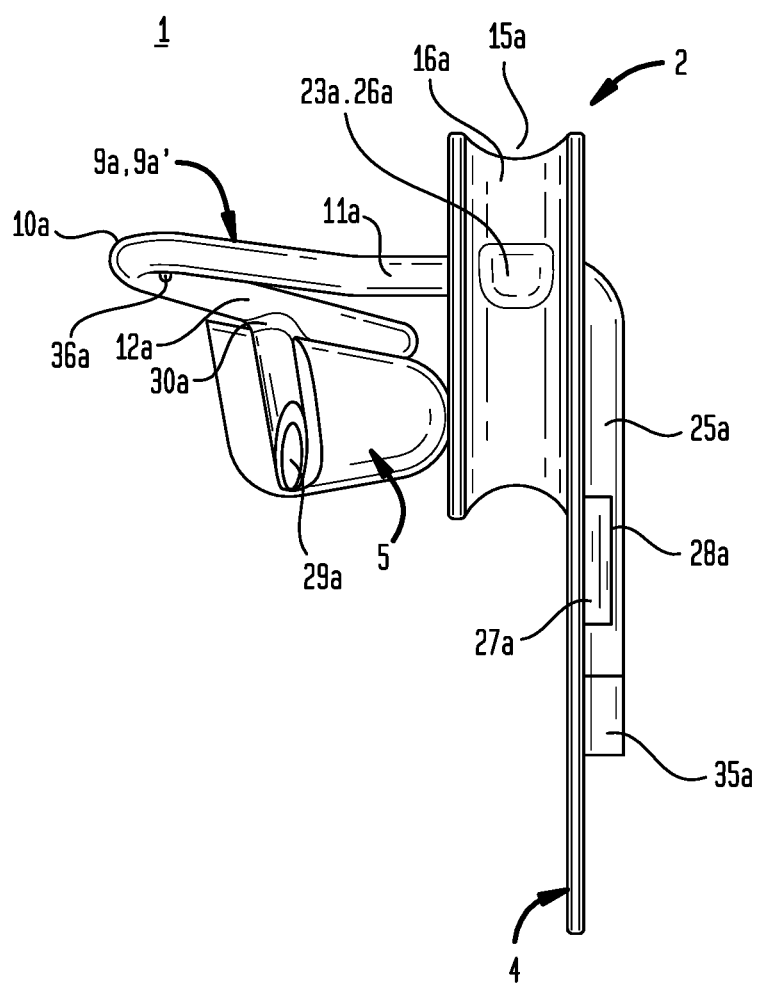
FIG. 7 is a second side elevation view of a particular embodiment of the inventive cheek retractor.
Figure 8:
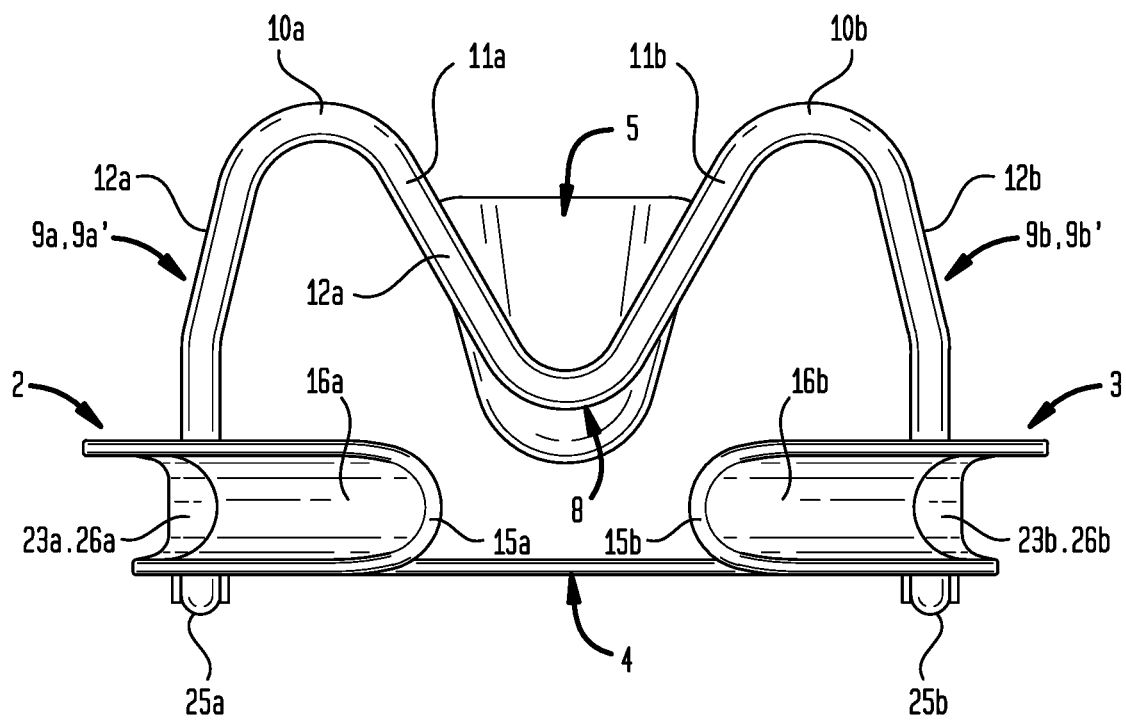
FIG. 8 is a top plan view of a particular embodiment of the inventive cheek retractor.
Figure 9:
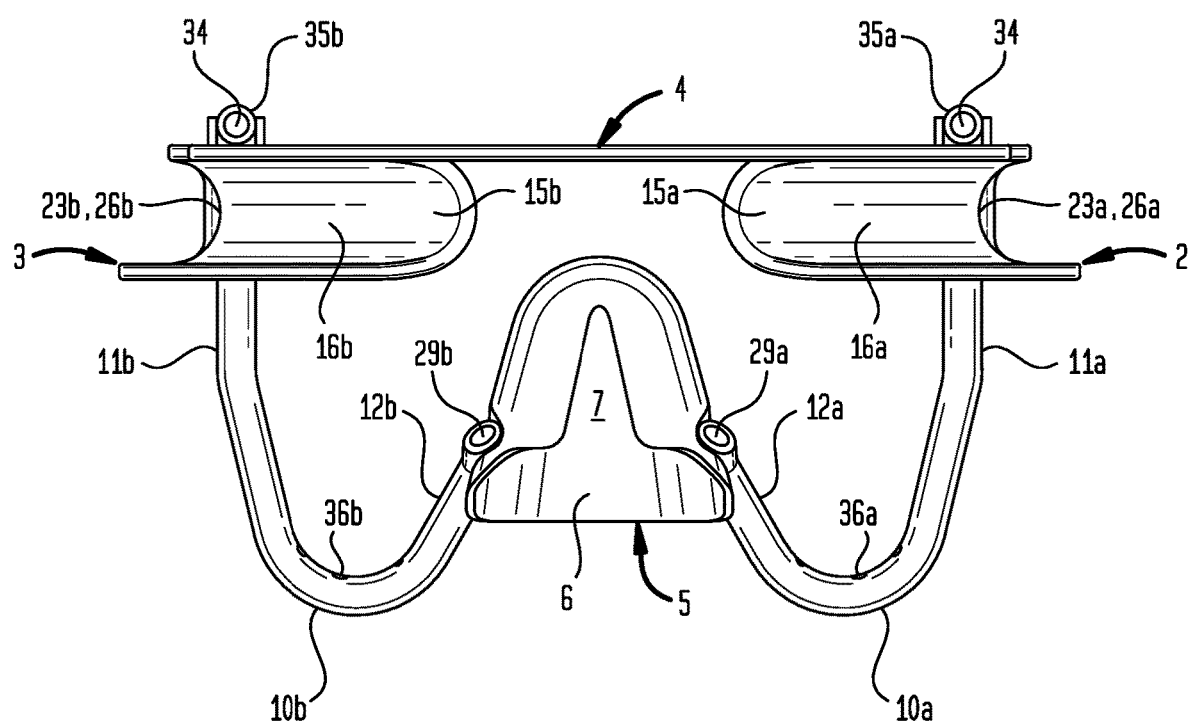
FIG. 9 is a bottom plan view of a particular embodiment of the inventive cheek retractor.

Now, with primary reference to FIG. 2, the bridge (4) can be disposed between the first lip holder (2) and the second lip holder (3) to hold the first lip holder (2) a distance from the second lip holder (3). The bridge (4) can comprise a resilient material to allow the first lip holder (2) and the second lip holder (3) to inwardly move to decrease the distance between the first lip holder (2) and the second lip holder (3) for insertion of the first lip holder (2) and the second lip holder (3) in the mouth (13) of a user (14) and to outwardly move to engage the first lip holder (2) and the second lip holder (3) with the lip (17) of the user (14).

Again, with primary reference to FIG. 2, particular embodiments can comprise or consist of a first integrated construct (18), including at least: the first lip holder (2), the second lip holder (3), and the bridge (4) coupled to the first lip holder (2) and the second lip holder (3). The first integrated construct (18) can be formed, molded or otherwise fabricated as one-piece. There can be a substantial advantage to having the first lip holder (2), the second lip holder (3), and the bridge (4) formed, molded, or otherwise fabricated as first integrated construct (18). In the first instance, there are no parts to assemble which confers the benefit of saving time and labor. In the second instance, there are no parts that can disassemble or can misalign when in normal use which confers a benefit of comfort and safety to the user (14). In the third instance, the first integrated construct (18) can be less expensive to produce, package, and transport. In the fourth instance, the learning curve to use the first integrated construct (18) can be less than that of assembly and use of a conventional multicomponent device.

Figure 10:
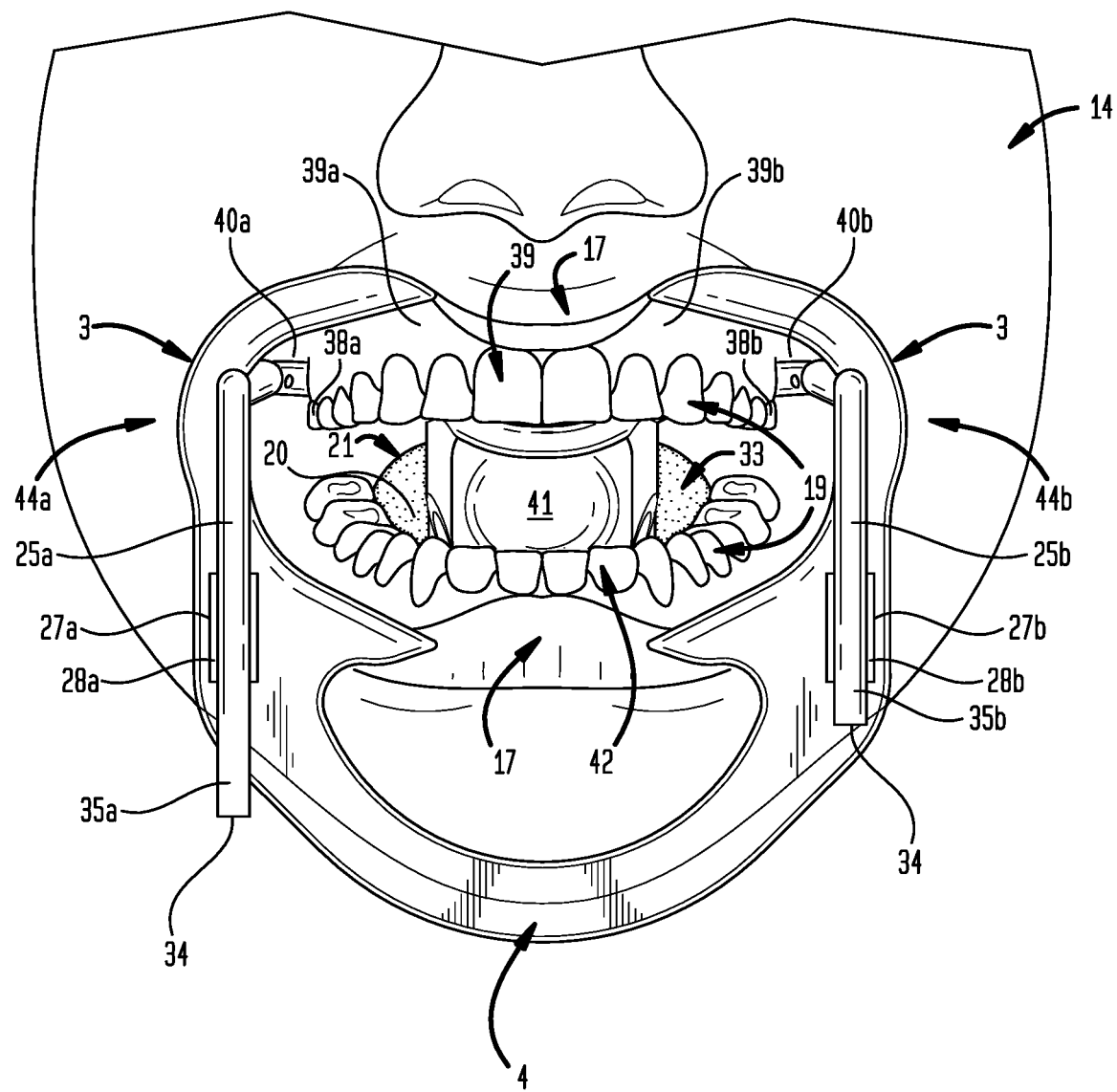
FIG. 10 is an illustration of a method of using a particular embodiment of the inventive cheek retractor.

Now, with primary reference to FIG. 10, when inserted into the mouth (13) of the user (14) with the lip (17) of the user (14) engaged with the lip engaging surface (16) of the first lip holder (2) and the second lip holder (3), the bridge (4) disposes the first lip holder (2) a distance from the second lip holder (3) to correspondingly hold the lip (17) of the user (14) away from the teeth (19) of the user (14). Embodiments, typically draw the lip (17) a distance apart occurring in a range of about 60 millimeters to about 80 millimeters; however, this is not intended to obviate embodiments which draw the lip (17) open to a greater or lesser extent, and certain embodiments can be made to fit children which may have a smaller mouth (13) and adults which may have a larger mouth (13). As used herein, the term "user (14)" includes a person, a patient, or a prospective patient.

Now, with primary reference to FIG. 1 through 10, particular embodiments can include a tongue receiver (5) including a tongue receiver surface (6) defining an open-ended chamber (7). The tongue receiver surface (6) can be adapted to or configured to receive a tongue tip (20) of the tongue (21) of the user (14) within the open-ended chamber (7). The tongue receiver (5) can be held in fixed spatial relation to the first lip holder (2) and the second lip holder (3) by a tongue receiver support (8) adapted to or configured to, directly or indirectly, couple the tongue receiver (5) to the first lip holder (2) and the second lip holder (3). Particular embodiments of the tongue receive support (8) can include a pair of arcuate support members (9a, 9b). Each of the pair of arcuate support members (9a, 9b) can comprise or consist of an arcuate portion (10a, 10b) joining a support member first arm (11a, 11b) adapted to correspondingly couple, directly or indirectly, to the first lip holder (2) or the second lip holder (3) and a second support member arm (12a, 12b) correspondingly coupled to the tongue receiver (5).

Now, with primary reference to FIGS. 1 through 9, particular embodiments, the first lip holder (2) or the second lip holder (3), or both of the first lip holder (2) and the second lip holder (3), can each be configured to mateably engage the support member first arm (11a, 11b) of the pair of arcuate support members (9a, 9b) in fixed spatial relation to each of the first lip holder (2) or the second lip holder (3) or both the first lip holder (2) and the second lip holder (3). In particular embodiments, the term "fixed spatial relation" means that a support member first arm (11a, 11b) can be secured to the first lip holder (2) or the second lip holder (3) in immovable relation in normal use of the dental appliance (1). In particular embodiments, a tongue tip (20) can be positioned in the tongue receiver (5) and the tongue receiver (5) disposed at a location in the mouth (13) of the user (14). The first lip holder (2) and second lip holder (3) can be correspondingly mateably engaged at a location along the length of the support member first arm (11a, 11b) of each of the pair of arcuate support members (9a, 9b). Mated engagement of the first lip holder (2) and the second lip holder (3) in fixed spatial relation to the corresponding support member first arm (11a, 11b) can maintain the tongue receiver (5) or the arcuate portion (10a, 10b)) of the pair of arcuate support members (9a, 9b) at selected locations in the mouth (13) of the user (14).

Again, with primary reference to FIGS. 1 through 9, in particular embodiments the first lip holder (2) and the second lip holder (3) can be configured to correspondingly releasably mateably engage the support member first arm (11a, 11b) of the pair of arcuate support members (9a, 9b). The support first arm (11a, 11b) by forcible urging can be released from the corresponding first lip holder (2) or second lip holder (3) and moved to correspondingly move the tongue receiver (5) or the arcuate portion (10a, 10b) of the pair of arcuate support members (9a, 9b) to a different location in the mouth (13) of the user (14). The support member first arm (11a, 11b) of the pair of arcuate support members (9a, 9b) can be reengaged by forcible urging in fixed spatial relation to the first lip holder (2) and second lip holder (3).

Again, with primary reference to FIGS. 1 through 9, in particular embodiments, the first lip holder (2) and the second lip holder (3) can be configured to afford sliding engagement along the length of the support member first arm (11a, 11b) of the pair of arcuate support members (9a, 9b). Sliding engagement allows the tongue receiver (5) or the arcuate portion (10a, 10b) of the pair of arcuate support members (9a, 9b) to be positioned at different locations in the mouth (13) of the user (14). The first lip holder (2) and the second lip holder (3) can be configured to maintain the support member first arm (11a, 11b) in fixed spatial relation during normal use of the dental appliance (1), and under forcible urging allow the support member first arm (11a, 11b) to slidingly move in relation the first lip holder (2) and the second lip holder (3).

Again, with primary reference to FIGS. 1 through 9, in particular embodiments, the first lip holder (2) and the second lip holder (3) and each support member first arm (11a, 11b) of the pair of arcuate support members (9a, 9b) can be configured as a snap fit joint (22) which correspondingly engages, releasably engages, or slidingly engages the support member first arm (11a, 11b) of the pair of arcuate support members (9a, 9b) with the first lip holder (2) and the second lip holder (3). In particular embodiments, the snap fit joint (22) can immovably fix the pair of arcuate support members (9a, 9b) in spatial relation to the first lip holder (2) and the second lip holder (3). Once the snap fit joint (22) engages the support member first arm (11a, 11b) to one of the first lip holder (2) or second lip holder (3) the support member first arm (11a, 11b) can become immovable under normal use.

In particular embodiments, once the snap fit joint (22) engages the support member first arm (11a, 11b) to one of the first lip holder (2) or second lip holder (3) the support member first arm (11a, 11b), it can be released upon forcible urging, from fixed spatial relation with the first lip holder (2) or the second lip holder (3) to allow movement of the support member first arm (11a, 11b), and the snap fit joint (22) can be reengaged to again establish the support member first arm (11a, 11b) in fixed spatial relation to the first lip holder (2) or the second lip holder (3).

In particular embodiments, once the snap fit joint (22) engages the support member first arm (11a, 11b) to one of the first lip holder (2) or second lip holder (3), the first lip holder (2) or the second lip holder (3) can slidingly release the support member first arm (11a, 11b) from fixed spatial relation under forcible urging, to allow sliding movement of the support member first arm (11a, 11b), and the snap fit joint (22) reengaged again establish the support member first arm (11a, 11b) in fixed spatial relation to the first lip holder (2) or the second lip holder (3) under normal use.

Now, with primary reference to FIG. 2, in particular embodiments, the snap fit joint (22a, 22b) can comprise or consist of a semi-annular recess (23) in the first lip holder (2) and in the second lip holder (3) configured to correspondingly engage in immovable relation, releasably engage, or slidingly engage, a support member first arm (11a, 11b) of the pair of arcuate support members (9a, 9b) having a generally circular transverse cross section, in fixed spatial relation to the first lip holder (2) and the second lip holder (3). The illustrative example of a snap fit joint (22) is not intended to preclude other joint configurations between the first lip holder (2) and the second lip holder (3) and the support member first arm (11a, 11b) of the pair of arcuate support members (9a, 9b).

Now, referring primarily to FIGS. 1 and 2, in particular embodiments, each of the first lip holder (2) and the second lip holder (3) can include a first support arm guide (24a, 24b) in which the support member first arm (11a, 11b) of each of the pair arcuate support members (9a, 9b) slidingly engage to orient the tongue receiver (5) and each of the arcuate support members (9a, 9b) in the mouth (13) of the user (14). Each of the support member first arms (11a, 11b) can further include a support arm terminal portion (25a, 25b) that extends to the bridge (4) disposed between the first lip holder (2) and the second lip holder (3) and mateably engages a bridge connector (4) to hold the support arm terminal portion (25a, 25b) in fixed spatial relation the bridge (4) and correspondingly fixes the spatial location of the tongue receiver (5) and the arcuate portion (10a, 10b) of the pair of arcuate support members (9a, 9b) in the mouth (13) of the user (14).

As shown in the illustrative examples of FIGS. 1 and 2, each support member first arm (11a, 11b) can correspondingly be positioned in a support member arm guide (24a, 24b) with each support arm terminal portion (25a, 25b) downwardly extending to corresponding mateably engage the bridge connector (27a, 27b). In particular embodiments, the support member arm guide (24a, 24b) can comprise a channel (26a, 26b) in each of the first lip holder (2) and the second lip holder (3). In particular embodiments, the channel (26a, 26b) can comprise a semi-annular recess configured to guide the support member first arm (11a, 11b) in sliding engagement but not necessarily maintain the support member first arm (11a, 11b) in fixed spatial relation to the first lip holder (2) and the second lip holder (3) as above described. The support member first arm (11a, 11b) of each of the pair of arcuate supports (9a, 9b) can resiliently flex to allow insertion and sliding engagement with the corresponding first support arm guide (26a, 26b) and each support arm terminal portion (25a, 25b) can be correspondingly connected to the bridge connector (27a, 27b). Each bridge connector (27a, 27b) can comprise a pair of resilient flanges (28a, 28b) which outwardly flex to receive the support arm terminal portion (25a, 25b) and inwardly flex to maintain the support arm terminal portion (25a, 25b) between the pair of resilient flanges (28a, 28b). In the illustrative example shown in the Figures, each support arm terminal portion (25a, 25b) can be disposed orthogonal or substantially orthogonal to the corresponding support member first arm (11a, 11b); however, this is not intended to preclude embodiments in which the support arm terminal portion (25a, 25b) can be disposed at other angles in relation to the support member first arm (11a, 11b) to connect to a bridge connector (27a, 27b), or all together obviated.

Now, with primary reference to FIGS. 1 through 10, in particular embodiments, at least one of the pair of arcuate support members (9a, 9b) can comprise a tubular arcuate support member (9a',9b') having at least one inlet opening (29a) proximate the tongue receiver (5). The term "proximate" for the purposes of this invention means near but not necessarily adjacent the tongue receiver (5). In the illustrative example, the support member second arm (12a, 12b) of a tubular arcuate support member (9a', 9b') includes a tee coupler (30a) from which a pickup tube (31a) extends to dispose the at least one inlet opening (29a) proximate or at the bottom of the tongue receiver (5). In particular embodiments, each support member second arm (12a, 12b) comprises a tubular support member second arm (12a', 12b') each having one inlet opening (29a, 29b) proximate the tongue receiver (5). In the illustrative example, the tubular support member second arm (12a', 12b') of each tubular arcuate support member (9a', 9b') includes a tee coupler (30a, 30b) from which a pickup tube (31a, 31b) extends to dispose an inlet opening (29a, 29b) at the bottom of opposite sides of the tongue receiver (5). The at least one inlet opening (29a, 29b) can be fluidically coupled to a vacuum source (32) to evacuate oral cavity secretions (33) from the mouth (13) of the user (14).

Now, with primary reference to FIGS. 1 through 10, in particular embodiments, the second support arm (12a, 12b) of each of said pair of arcuate support members (9a, 9b) can be joined to form a one-piece tongue receiver support (8). In particular embodiments, the one-piece tongue receiver support (8) can comprise a pair of arcuate member support members (9a, 9b) each being solid and in other particular embodiments, the one-piece tongue receiver support (8) can comprise a pair of arcuate member support members (9a, 9b) one of which comprises a solid arcuate member support (9a) and one of which comprises a tubular arcuate support member (9b'). In other particular embodiments, the one-piece tongue receiver support (8) can comprise a pair of arcuate member support members (9a, 9b) both of which comprise a tubular arcuate support member (9a', 9b') to provide one continuous hollow passage (34) which terminates in one open end (35a or 35b) or terminates in two open ends (35a, 35b). In the illustrative example of FIG. 1, the one-piece tongue receiver support (8) comprises one continuous hollow passage (34) having one open end (35a). Accordingly, in particular embodiments, a vacuum source (32) can be coupled to the one open end (35), and in other particular embodiments, the vacuum source (32) can be coupled to one or both of two open ends (35a, 35b).

Now, with primary reference to FIGS. 1 and 2, in particular embodiments, one or both of the pair of arcuate supports (9a, 9b) defining a hollow passage (34) can include at least one inlet opening (36a) disposed in the arcuate portion (10a, 10b). In the illustrative example, each arcuate portion (10a, 10b) of the pair of arcuate supports (9a, 9b) each include at least one inlet opening (36a, 36b). In particular embodiments, one or both of the arcuate portions (10a, 10b) of the pair of arcuate supports (9a, 9b) can include a plurality of inlet openings (36a, 36b). The one inlet opening (36a, 36b) or the plurality of inlet openings (36a, 36b) can be disposed on the lesser radius (37a, 37b) of arcuate portion (10a, 10b) generally oriented toward the first lip holder (2) and the second lip holder (3), and when positioned in the mouth (13) of the user (14) facing the rearmost left side or rearmost right-side molars (38). The at least one inlet opening (36a, 36b) disposed in the arcuate portion (10a, 10b) allows evacuation of oral cavity secretions (33) proximate the rearmost molars in the mouth (38) of the user (14). However, this illustrative example is not intended to exclude embodiments having a greater or lesser number of inlet openings (36a, 36b) in the arcuate portions (10a, 10b) of the pair of arcuate supports (9a, 9b). As shown in the illustrative example, embodiments can include at least one inlet opening (29a, 29b) proximate the tongue receiver (5) and at least one inlet opening (36a, 36b) disposed in one or both of the arcuate portions (10a, 10b).

Again, primarily referring to FIGS. 1 through 10, embodiments of the pair of arcuate supports (9a, 9b) can comprise a substantially rigid material which maintains, or resiliently maintains, a fixed configuration of the pair of arcuate supports (9a, 9b) given sufficient flexure to be engaged with the first lip holder (2) and the second lip holder (3). There can be a substantial advantage in having a fixed configuration of the pair of arcuate supports as compared to the conventional pliant tubes utilized in the conventional arts in that the tongue receiver (5) supported by each of the pair of arcuate supports (9a, 9b) can be passed through the mouth opening (41) of the user (14) having the lip (17) drawn back from the teeth (19) by engagement of the first lip holder (2) and the second lip holder (3) to affirmative dispose the corresponding arcuate portion (10a, 10b) of the pair of arcuate supports (9a, 9b) behind the rearmost molar (38) on the left side of the maxillary dental arch (39a) and the right side of maxillary dental arch (39b) with the corresponding support member first arm (11a, 11b) extending along the left buccal mucosa (40a) or the right buccal mucosa (40b) toward the mouth opening (41) of the user (14) which corresponding draws left buccal mucosa (40a) or the right buccal mucosa (40b) away from the teeth (19) of both the maxillary dental arch (39) and the mandibular dental arch (42) to allow access to even the most rearward molars (38) of the maxillary dental arch (39) and the mandibular dental arch (42).

Now, with primary reference to FIGS. 1 and 2, particular embodiments can comprise or consist of a second integrated construct (43) adapted to couple in fixed spatial relation to the first integrated construct (18), the second integrated construct (43), including: a tongue receiver (5) having an tongue receiver interior surface (6) defining an open-ended chamber (7) and a tongue receiver support (8) including a pair of arcuate support members (9a, 9b) each having an arcuate portion (10a, 10b) joining a support member first arm (11a, 11b) correspondingly adapted to couple to the first lip holder (2) or the second lip holder (3) and a support member second arm (12a, 12b) correspondingly coupled to the tongue receiver (5). The second integrated construct (43) adapted to couple in fixed spatial relation to the first integrated construct (18) when the first integrated construct (18) engages first lip holder (2) and the second lip holder (3) to the lip (17) of a user (14) to draw the lip (17) away from the teeth (19) in the mouth (13) of the user (14). In particular embodiments, the tongue receiver (5) and the tongue receiver support (8) may comprise two parts that can be engaged to produce the second integrated construct (43).

The second integrated construct (43) can be formed, molded or otherwise fabricated as one-piece. There can be as substantial advantage to having the tongue receiver (5) and the tongue receiver support (8) formed, molded, or otherwise fabricated as only one-piece. In the first instance, there are no parts to assemble which confers the benefit a saving labor and time. In the second instance, there are no parts that can disassemble or can misalign when in use which confers a benefit of comfort and safety to the user (14). In the third instance, the second integrated construct (43) can be less expensive to produce, package, and transport. In the fourth instance, the learning curve to use the second integrated construct (43) can be less than that of assembly and use of a conventional multicomponent device. In the fifth instance, it reduces the number of components in the inventive dental appliance (1) as compared to conventional cheek retractors. In the sixth instance, the combination of the first integrated construct (18) engaged with the second integrated construct (43) confers functional advantages that are not encompassed by conventional cheek retractors in that the buccal mucosa (40a, 40b) can be drawn away from even the rearmost molars (38) of the user (14).

Now, with primary reference to FIG. 10, a method of using the inventive dental appliance (1) can comprise of or consist of one or more of: engaging a first lip holder (2) to a lip (17) of a mouth (13) of a user (14), and engaging a second lip holder (3) to the lip (16) of the mouth (13) of the user (14). Embodiments of the method can further include engaging a tongue receiver (5) with a tongue tip (20) of tongue (21) inside of the mouth (13) and engaging or coupling the tongue receiver (5) to the first lip holder (2) and the second lip holder (3) with a tongue receiver support (8), wherein the tongue receiver support (8) including a pair of arcuate support members (9a, 9b) each having an arcuate portion (10a, 10b) joining a support member first arm (11a, 11b) to a support member second arm (12a, 12b), each second support arm (12a, 12b) extending from said tongue receiver (5) to the corresponding arcuate portion (10a, 10b), and correspondingly disposing one arcuate portion (10a) behind a left rearmost maxillary molar (38a) and one arcuate portion (10b) behind a right rearmost maxillary molar (38b) with a corresponding support member first arm (11a) extending along a left buccal side of a maxillary dental arch (39a) and a right buccal side of a maxillary dental arch (39b) to correspondingly engage, slidingly engage, or releasably correspondingly couple to the first lip holder (2) and the second lip holder (3). Embodiments of the method can further comprise drawing the lip (17) away from teeth (19) in the mouth (13) by engaging said first lip holder (2) and said second lip holder (3) to the lip (17), and in particular embodiments, disposing the lip (17) a distance apart occurring in a range of about 60 millimeters to about 80 millimeters. The method can further include drawing the left cheek (44a) and the right cheek (44b) away from the teeth (19) by engaging the support member first arm (11a, 11b) of the pair of arcuate support members (9a, 9b) to a corresponding one of a left buccal mucosa (40a) of the left cheek (44a) and a right buccal mucosa (40b) of the right cheek (44b). The method can further include drawing the left cheek (44a) and the right cheek (44b) away from the teeth (19) to expose the rearmost maxillary molars (38a, 38b).

As can be easily understood from the foregoing, the basic concepts of the present invention may be embodied in a variety of ways. The invention involves numerous and varied embodiments of a dental appliance and methods for making and using such dental appliance including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "lip holder" should be understood to encompass disclosure of the act of "lip holding"—whether explicitly discussed or not—and, conversely, were there is a disclosure of the act of "lip holding", such a disclosure should be understood to encompass disclosure of a "lip holder" and even a "means for lip holding". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the dental appliances herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A dental appliance, comprising:
a first lip holder;
a second lip holder;
a bridge disposed between said first lip holder and said second lip holder;
a tongue receiver having an interior surface defining an open-ended chamber;
a tongue receiver support including a first tubular arcuate support member having an arcuate portion joined to a first support member arm adapted to correspondingly couple to said first lip holder and a second tubular arcuate support member having an arcuate portion joined to a second support member arm adapted to correspondingly couple to said second lip holder,
wherein said first tubular arcuate support or said second tubular arcuate support having at least one inlet opening,
wherein said first tubular arcuate support or said second tubular arcuate support having at least one outlet opening configured to couple to a vacuum source.

2. The dental appliance of claim 1, wherein said at least one inlet opening disposed proximate said tongue receiver.

3. The dental appliance of claim 1, wherein said at least one inlet opening disposed in said arcuate portion of said first arcuate support member or said second arcuate support member.

4. The dental appliance of claim 1, wherein said at least one inlet opening comprises at least one inlet opening proximate said tongue receiver and at least one inlet opening disposed in said arcuate portion of said first arcuate support member and said second arcuate support member.

5. The dental appliance of claim 1, wherein said tongue receiver support comprises a one-piece tubular tongue receiver support.

6. The dental appliance of claim 5, wherein said one-piece tubular tongue receiver support having at least one inlet opening proximate said tongue receiver.

7. The dental appliance of claim 5, wherein said one-piece tubular tongue receiver support having at least one inlet opening disposed in said arcuate portion.

8. The dental appliance of claim 5, wherein said one-piece tubular arcuate support member having at least one inlet opening proximate said tongue receiver and at least one inlet opening disposed in said arcuate portion.

9. The dental appliance of claim 5, wherein said one-piece tubular tongue receiver support having at least one inlet opening proximate said tongue receiver or at least one inlet opening disposed in said arcuate portion.

10. The dental appliance of claim 1, wherein said first lip holder and said second lip holder each having a lip engaging surface configured to engage a lip of a user to draw said lip away from teeth within said mouth of said user.

11. The dental appliance of claim 10, wherein said bridge resiliently flexes to draw said lip of said user a distance apart, said distance occurring in a range of about 60 millimeters to about 80 millimeters.

12. The dental appliance of claim 10, wherein said tongue receiver interior surface defining said open-ended chamber configured to receive a tongue tip of a tongue.

13. The dental appliance of claim 12, wherein said tongue receiver support configured to correspondingly dispose said arcuate portion of said pair of arcuate support members behind a left and right rearmost maxillary molar with said first support member arm correspondingly extending along a left and right lingual side of a maxillary dental arch to correspondingly move said left or right cheek away from said teeth.

14. A dental appliance, comprising:
a first lip holder;
a second lip holder;
a bridge disposed between said first lip holder and said second lip holder;

a tongue receiver; and a tongue receiver support including a first arcuate support member having an arcuate portion joined to a first support member arm adapted to correspondingly couple to said first lip holder and a second arcuate support member having an arcuate portion joined to a second support member arm adapted to correspondingly couple to said second lip holder, wherein said first lip holder and said second lip holder each having a joint configured to correspondingly releasably engage said first lip holder and second lip holder in fixed spatial relation along said first support arm and said second support.

15. The dental appliance of claim 14, wherein releasable engagement of said first lip holder and said second lip holder along said first support arm and said second support arm allows movement of said tongue receiver in spatial relation to said first lip holder and said second lip holder.

16. The dental appliance of claim 14, wherein releasable engagement of said first lip holder and said second lip holder along said first support arm and said second support arm allows movement of said arcuate portion of said first arcuate support member and said second arcuate support member in spatial relation to said first lip holder and said second lip holder.

17. The dental appliance of claim 14, wherein said joint comprises a semiannular recess in said first lip holder and in said second lip holder configured to correspondingly releasably engage said first support arm and said second support arm in fixed spatial relation to said first lip holder and said second lip holder.

18. The dental appliance of claim 14, wherein said first support arm and said second support arm correspondingly slidingly engage said first lip holder and said second lip holder.

19. The dental appliance of claim 18, wherein sliding engagement of said first support arm and said second support arm said first lip holder and to said second lip holder correspondingly moves said tongue receiver in spatial relation to said first lip holder and said second lip holder.

20. The dental appliance of claim 18, wherein sliding engagement of said first support arm and said second support arm to said first lip holder and said second lip holder correspondingly moves said arcuate portion of said first arcuate support member and said second arcuate support member in spatial relation to said first lip holder and said second lip holder.

21. A dental appliance, comprising:
a first lip holder;
a second lip holder;
a bridge disposed between said first lip holder and said second lip holder;
a tongue receiver; and
a tongue receiver support including a first arcuate support member having a first arcuate portion joined to a first support member arm adapted to correspondingly couple to said first lip holder and a second arcuate support member having a second arcuate portion joined to a second support member arm adapted to correspondingly couple to said second lip holder, wherein said first arcuate support member and second arcuate support members join to form a one-piece tongue receiver support, wherein said one-piece tongue receiver support comprises a one-piece tubular tongue receiver support, wherein said one-piece tubular tongue receiver support having at least one inlet opening proximate said tongue receiver.

22. A dental appliance, comprising:
a first one-piece construct, including:
a first lip holder;
a second lip holder;
a bridge disposed between said first lip holder and said second lip holder; and
a second one-piece construct adapted to couple in fixed spatial relation to said first one-piece construct, including:
a tongue receiver having an interior surface defining an open-ended chamber;
a tongue receiver support including a first arcuate support member having arcuate portion joined to a first support member arm adapted to correspondingly couple to said first lip holder and a second arcuate support member joined to a second support member arm adapted to correspondingly couple to said second lip holder.

23. The dental appliance of claim 22, wherein said second one-piece construct adapted to couple in fixed spatial relation to said first one-piece construct with said first one-piece construct having said first lip holder and said second lip holder prior engaged to said lip to draw said lip away from said teeth.

* * * * *